United States Patent [19]

Haley

[11] 4,116,464
[45] Sep. 26, 1978

[54] AUTOMATIC BRAKE FOR WHEELED CARRIAGES
[76] Inventor: Frederick J. Haley, 819 Stevens St., Lowell, Mass. 01851
[21] Appl. No.: 813,006
[22] Filed: Jul. 5, 1977

Related U.S. Application Data
[62] Division of Ser. No. 718,539, Aug. 30, 1976.
[51] Int. Cl.² .............................................. B62b 3/02
[52] U.S. Cl. .................................... 280/647; 280/649; 280/650; 280/658; 280/33.99 C
[58] Field of Search ............... 280/642, 644, 647, 648, 280/649, 650, 33.99 C; 188/2 R, 2 F, 2 G, 31, 69, 20; 403/166; 248/231

[56] References Cited
U.S. PATENT DOCUMENTS

| | | | |
|---|---|---|---|
| 1,709,527 | 4/1929 | Ford | 188/20 |
| 2,679,302 | 5/1954 | Watson | 188/31 |
| 2,988,175 | 6/1961 | West | 188/31 |
| 3,612,460 | 10/1971 | Smith | 248/231 |
| 3,836,174 | 9/1974 | Halman | 403/166 |
| 3,883,149 | 5/1975 | Perego | 280/649 |

*Primary Examiner*—Robert R. Song
*Attorney, Agent, or Firm*—Pearson & Pearson

[57] ABSTRACT

An automatic brake for wheeled, carriages is characterized by U-shaped rod brackets, with integral out turned ears having brake rods slidable, and spring biased outwardly therein. The rods are preferably right angular so that identical brackets can be used for the telescopable finger grip actuating mechanism. In baby carriages the finger grip is spaced only for adult hands. In wheel chairs the brakes are released by the finger grip of the pusher or by a lever actuated by the leg of the occupant. In shopping carts the brakes are released by the finger grip of the pusher or by a lever actuated by the upswing of the rearward nesting gate.

6 Claims, 13 Drawing Figures

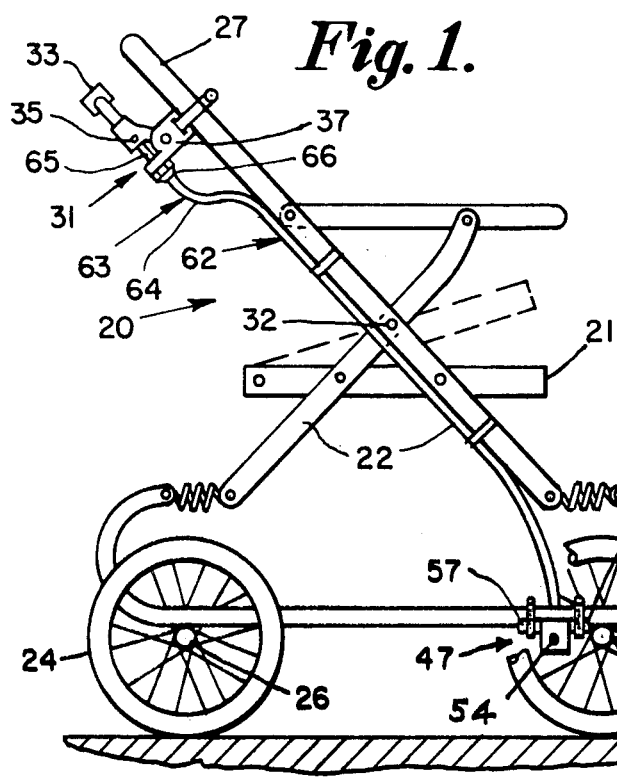
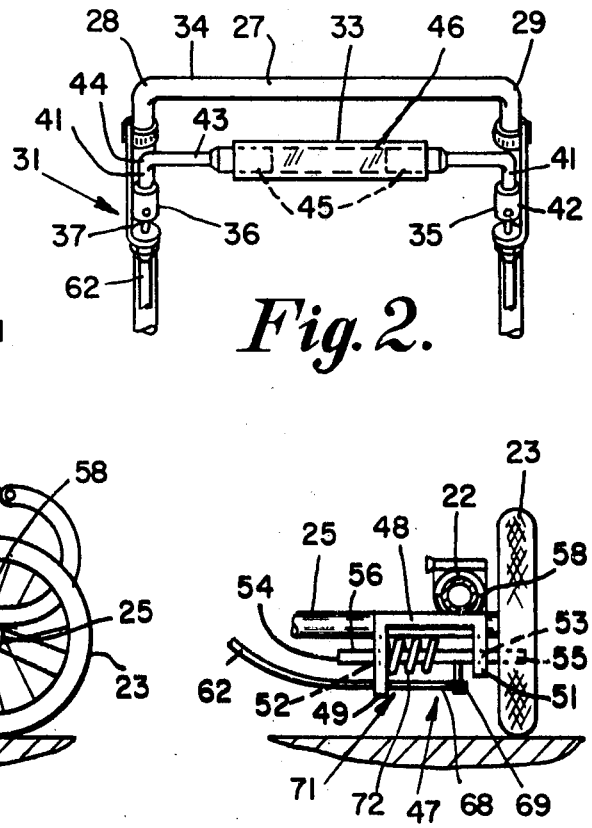
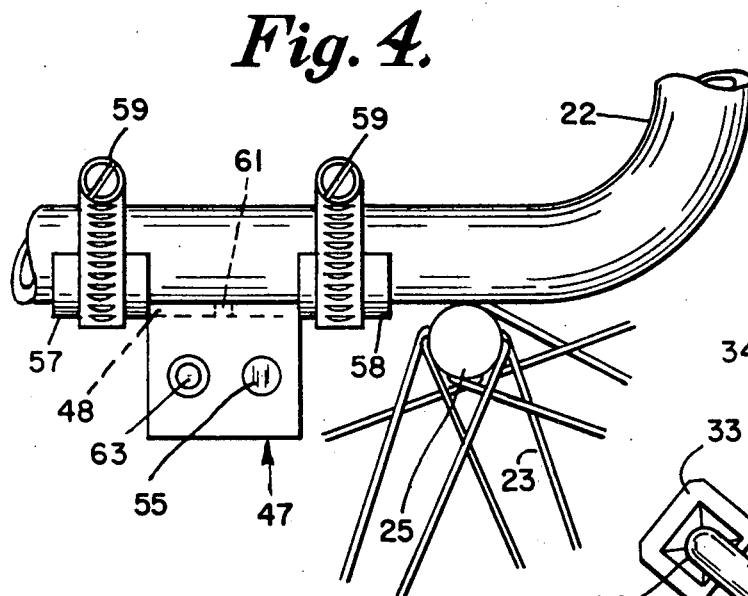
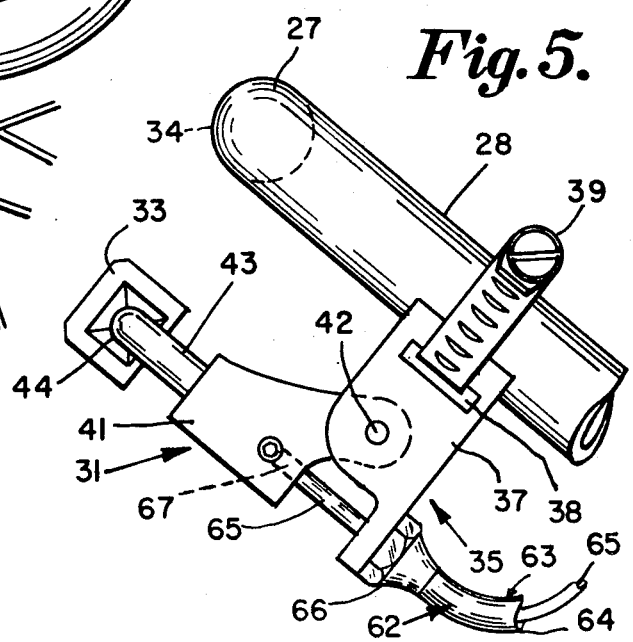

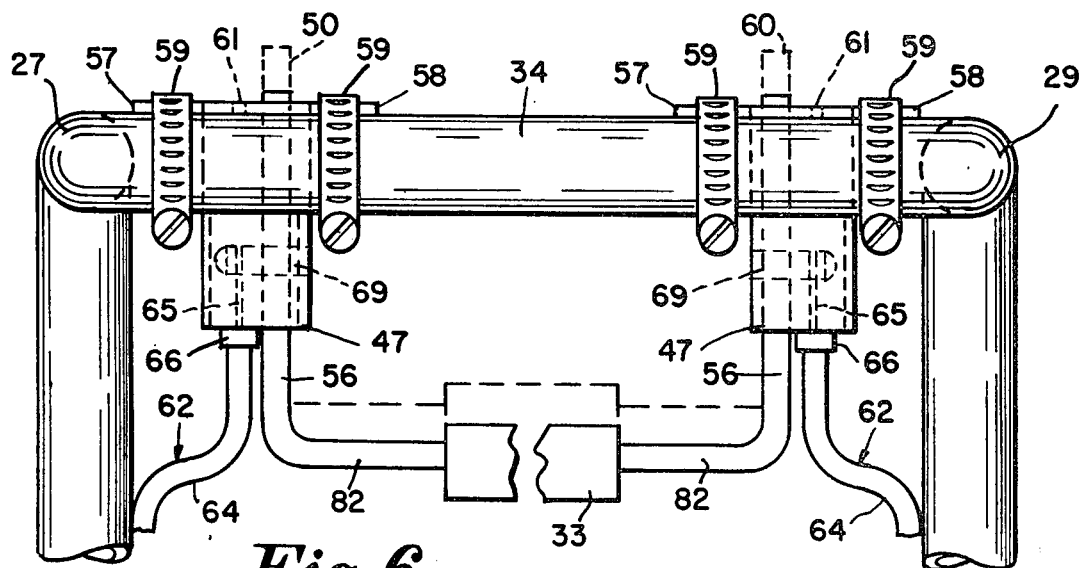
Fig.6.
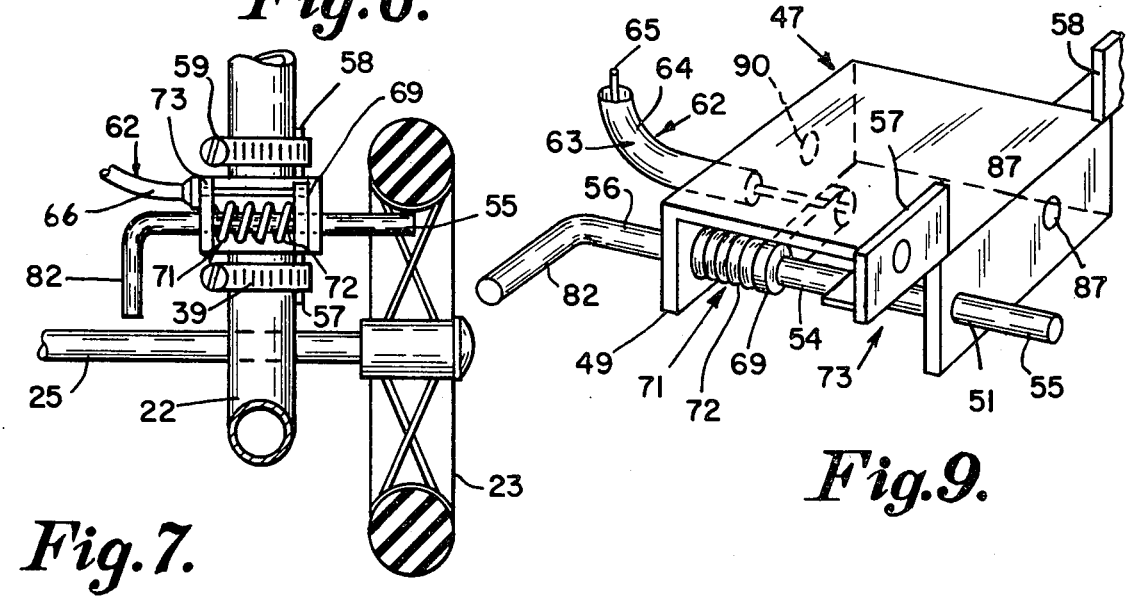
Fig.7.
Fig.9.
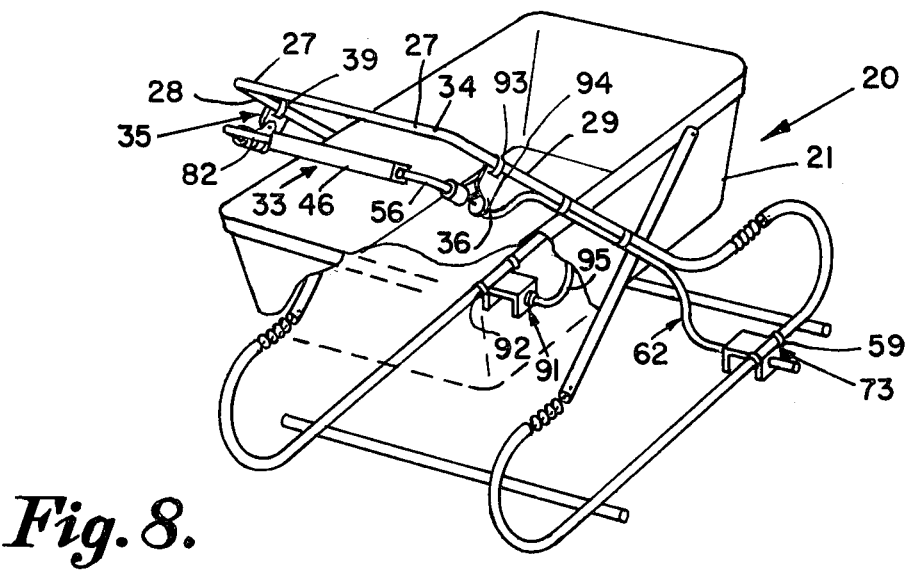
Fig.8.

AUTOMATIC BRAKE FOR WHEELED CARRIAGES

CROSS-REFERENCE TO RELATED APPLICATIONS

This application is a division of copending application Ser. No. 718,539 filed Aug. 30, 1976.

BACKGROUND OF THE INVENTION

It has heretofore been proposed to provide baby carriages with automatic safety devices to prevent the carriage from rolling down hill when unattended. Typical of such devices is that disclosed in U.S. Pat. No. 1,709,527 to Ford of Apr. 16, 1929 wherein a telescopable, pivoted finger grip lever on the push bar handle is connected by a Bowden wire to a bolt, or rod, slidable in a bracket mounted on an axle.

Similar automatic braking devices are disclosed in U.S. Pat. Nos. 716,716 to Jones of Dec. 23, 1902, U.S. Pat. No. 2,254,786 to Snyder of Sept. 2, 1941 and many others.

None of the many automatic safety devices of the prior art appear to have created a public demand therefor to the extent of being readily available commercially on carriages, wheelchairs, shopping carts and strollers found on sale, or in use, in present day stores. One of the reasons may be that they require numerous specially molded, or shaped, metal parts thereby raising the cost to the level that manufacturers feel it unwise to provide the product because of the consequent increase in price.

SUMMARY OF THE INVENTION

In this invention, the three conventional elements of an automatic brake are retained namely a finger grip lever on the carriage handle, a brake rod bracket on the frame adjacent a wheel and a flexible cable connection therebetween.

However, in baby carriages or strollers the brake rod bracket is mounted on a front wheel so that if it inadvertently is non-retractable, the carriage can still be moved by leaning on the push bar handle and supporting the carriage on the rear wheels. The handle carried finger grip bracket is preferably mounted under the push bar handle, rather than above the same, so that when a foldable stroller is collapsed, the finger grip will not be compressed against the body to release the wheels. Thus a collapsed stroller will not roll freely but must have its brake released.

In addition, the finger grip brackets may be commercially available, rugged, bicycle, brake cable, brackets, and the flexible cables are bicycle brake cables, rather than Bowden wires, to reduce cost and avoid the need for special parts.

In an unusually low cost embodiment of the invention, the brake rod bracket and the finger grip bracket are identical, there being a right angular brake rod slidable in the upstanding walls of a bracket, the bracket being clamped on the frame or handle by an integral out-turned flange and worm drive clamps and the right angular portion of the rod serving as a finger grip, or having a hollow tube sleeved between two such portions to form a telescopable finger grip.

BRIEF DESCRIPTION OF THE DRAWING

FIG. 1 is a side elevational view of a typical collapsible carriage, or stroller, with an automatic safety device of the invention mounted thereon;

FIG. 2 is a fragmentary rear elevation showing the telescopable finger grip;

FIG. 3 is a fragmentary rear elevation showing the brake rod bracket and wheel;

FIG. 4 is an enlarged detail side elevation showing the brake rod bracket and wheel;

FIG. 5 is an enlarged side elevation showing the bicycle brake type pivot supports for the finger grip;

FIG. 6 is a fragmentary rear elevation of a preferred form of combined brake rod bracket and finger grip bracket, mounted on the push bar handle;

FIG. 7 is a fragmentary plan view showing the bracket of FIG. 6 used as a brake rod bracket;

FIG. 8 is a perspective view from the rear of a collapsible baby carriage, with parts broken away for clarity and showing two finger grip brackets and two brake rod brackets, all identical;

FIG. 9 is an enlarged rear elevational view of the preferred form of bracket mounted on the push bar handle and supporting a reciprocable finger grip.

DESCRIPTION OF A PREFERRED EMBODIMENT

Figure 10:
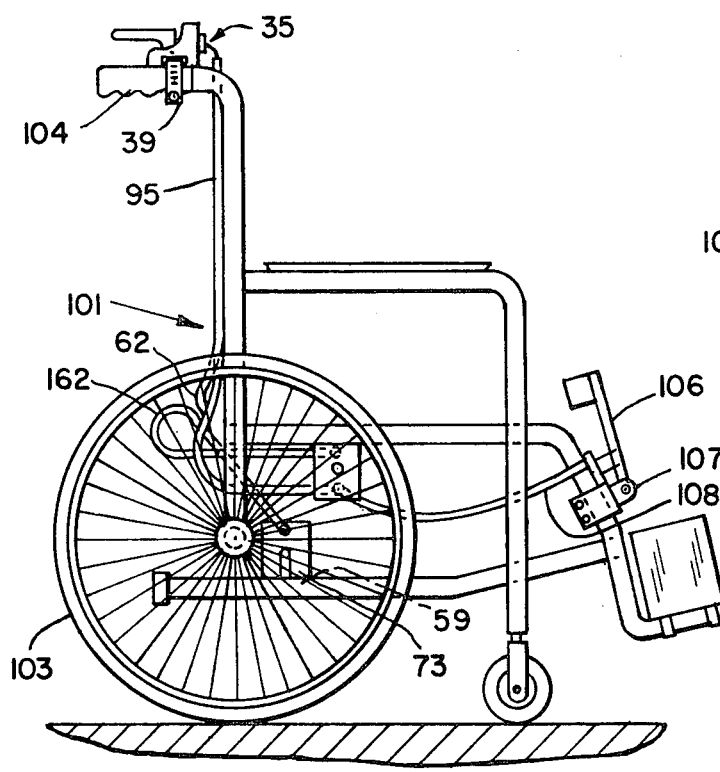
FIG. 10 is a side elevation and FIG. 11 is a front elevation of a wheel chair with the automatic safety device of the invention plus a leg operated release for the occupant.

A typical baby carriage, or baby stroller 20, of the collapsible type, is shown in the FIGS. 1 and 8, the fabric, or metal, body 21 being supported in the foldable, collapsible, skeletonized frame 22. Spoked front wheels 23 and spoked rear wheels 24 are rotatable on axles 25 and 26 and a push bar handle 27 extends across the upper rear of the body and frame from one end 28 to the opposite end 29.

While the more expensive carriages often have a pedal actuated foot brake which frictionally bears against the tires of the wheels, such devices are not automatic and the user may neglect to apply the brake on a slope or an applied brake may be inadvertently released to permit the carriage, or stroller, to travel unattended down hill with its occupant.

The automatic safety brake 31 of this invention is especially useful on foldable strollers 20, which may have no brake mechanism at all, and in which the push bar handle 27 is pivoted at 32 to the frame 22 for folding from normal position, at the upper rear of the body and frame, in an arcuate path, to the compact folded position at the lower front of the collapsed stroller. In prior art devices, the finger grip of the safety brake has been mounted above the push bar handle, which, in a collapsible stroller, may cause the brake to be released by reason of the finger grip engaging the body as it is moved to folded position.

In this invention, the telescopable finger bar 33 extends in parallelism to the rectilienar horizontal portion 34 of the push bar handle 27 but below the handle so that it is above the handle upon folding and continues to lock the wheels even when the stroller is collapsed. The finger bar 33 includes a pair of identical pivot brackets 35 and 36, preferably of the bicycle brake pivot handle type, each depending portion 37 thereof having a slot 38 for a worm drive clamp 39 by which it is firmly affixed to one end 28 of the push bar handle 27. The pivotable element 41 of each bracket 35 or 36, is pivoted at 42 to the portion 37 and includes the integral portion 43, bent at right angles at 44 and terminating in the elongated head 45 of square cross section. A hollow tube 46 of square cross section is slidably received on the oppositely facing heads 45 of the elements 41, centrally of the carriage, so that the finger bar is telescopable to fit carriages of various widths.

The central tube 46 of the finger bar 33 is normally spaced from the corresponding portion of push bar handle 27 about 2½ inches and the materials of the tube 46 and the handle 27 are at least ½ inch in width or diameter so that the total span to be grasped in the fingers of the user is about 3½ inches. Thus the baby occupying the stroller, or some other child approaching the stroller will have hands too small to be able to grasp both the safety bar and handle at the same time and cannot release the stroller to travel down hill. Of course, any child outside the stroller would have to let go, or run along beside the stroller if he were able to move the finger grip and the stroller would stop automatically as soon as the grip was released.

The brake rod brackets 47 of the invention are preferably of elongated U-shaped configuration with a central web, or bight, 48 and a pair of integral upstanding legs 49 and 51. In the embodiment of FIGS. 1-5, a pair of registering, brake rod holes 52 and 53 are provided, each in a leg 49 or 51, for slidably receiving a brake rod 54 of circular cross section, the rod 54 having a wheel spoke obstructing portion 55 projecting outside the bracket and having an integral portion 56, extending from the opposite side of the bracket. A pair of integral ears 57 and 58 project from the web 48, each being affixed to the frame 22 by a worm drive clamp such as 59. One or more machine screw, or bolt, holes 61 may be provided in web 48 to permit the bracket to be affixed by other than worm drive clamps.

Flexible cable control means 62 is provided preferably comprising a bicycle brake flexible cable 63 having a sheath 64 and a stranded cable 65 therewithin, since Bowden wires have been found to be too stiff to give the desirable "soft touch" of the invention. It will be understood that tired, inattentive mothers, fathers, nursemaids or older children, especially on a long shopping trip pushing a stroller may find constant pressure on a stiff safety brake finger grip to be irksome and may try to fasten the grip down so that a gentle pressure is an additional desirable feature. One end of cable 65 is affixed to the depending portion 37 of the handle carried bracket 35 by suitable fittings 66 such as 3/16 inch copper tubing compression fittings, and the other end of cable 65 is affixed by a similar fitting 66 to the elongated, U-shaped, frame carried bracket 47. One end 67 of the tension cable 65 is affixed to the pivotable element 41, and the opposite end 68 is affixed to a set screw slide 69, on brake rod 54 between legs 49 and 51.

Spring means 71 in the form of a compression coil spring 72, encircling rod 54 between the leg 51 and the set screw slide 69 resiliently urges the spoke obstructing portion 55 of brake rod 54 into the rotational path of the front wheel 23 under predetermined compression, the portion 55 retracting when the finger bar 33 is gently pressed toward the push bar handle 27.

In FIGS. 6-9, a preferred form of the invention is disclosed wherein an elongated U-shaped bracket 73, similar to brake rod bracket 47, is used not only for supporting the brake rod, but identical such brackets are used for supporting a rectilinearly moveable telescopable finger bar on the push bar handle.

Brackets 47 and 73 include integral ears 57 and 58, in a plane outside of the plane in which the brake rod and the cable are moveable, so that worm drive clamps 39 or 59 may press the ears against a frame piece of frame 22, proximate the front wheels.

One or more bolt holes 87 may be provided for installations in which worm drive clamps prove unusable. Additional holes 90 are provided for additional control wires.

In FIGS. 6 and 7, it will be seen that two identical brackets, first bracket 47 and second bracket 73, connected by flexible cable means 62, constitute a low cost automatic safety brake held in place by first clamp means 59 and second clamp means 39. Brake rod 55 of the frame carried brackets 73 includes the spring means 71 and set screw slide 69, the finger grip portion 82 being held up out of the way by the means 62. While a second spring could be used in the handle carried bracket 47 it is not necessary but the set screw slide is used. By pressing finger grip portion 82 of rod 54 in bracket 47 toward push bar handle 27 the spring is compressed and the brake rod retracted.

As shown in FIG. 8, first brake rod bracket means 73 and first clamp means 59 are mounted at one front wheel, finger grip bracket means 35 and clamp means 39 are mounted on the push bar handle, on the end 28. Brake rod bracket means 91 and clamp means 92 are mounted on the opposite front wheel and finger grip bracket means 36 and clamp means 94 are mounted on the opposite end 29 of push bar handle 27. The first flexible cable control means 62 and the second flexible cable control means 95 connect each wheel bracket with the opposite handle bracket. The finger grip portions 56 or 82 of the two handle mounted brackets are faced inwardly toward each other to receive the central hollow tube 46.

Figure 11:
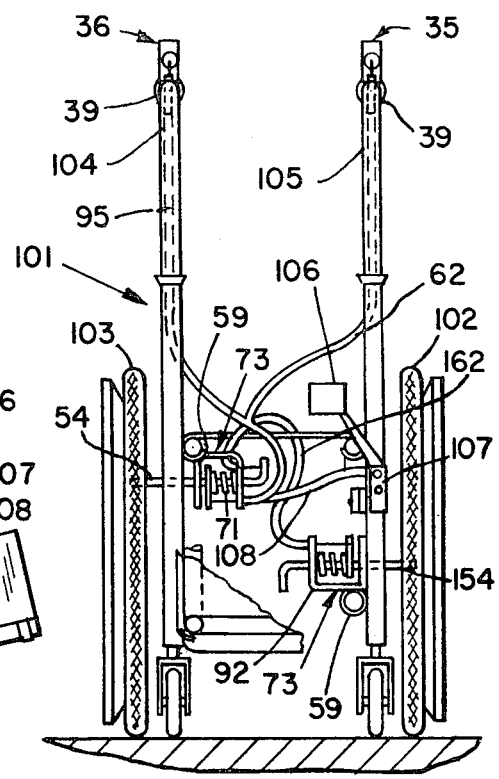

As shown in FIGS. 10 and 11, the brake of the invention may be installed on a foldable wheel chair 101 of the type having large, wheels 102 and 103 for turning by the occupant and push handles 104 and 105 for the use of a nurse. As in the case of the baby carriages and strollers of FIGS. 1-9, at least one brake rod bracket means 73, clamp means 59, cable control means 62, spring means 71, finger actuating means 35, and clamp means 39 is provided for one wheel 103.

Preferably a duplicate set is provided for the other wheel 102 as shown at 73, 59, 95, 36 and 39 cable control means 95 bein connected to means 62, whereby the nurse may press either handle in order to retract both brake rods from the spokes and move the wheel chair. Brake rod 54 is connected to the rod 154 of the other bracket 73 by cable means 162 so that one brake rod 54 retracts the other rod 154.

While it is not desirable for an infant, or his contempories, to be able to release the brakes of a carriage, this invention provides a release lever 106, in the path of movement of the occupant's legs, and supported in a bracket means 107 on chair 101, the lever being connected by a cable control 108, to brake rod 54 on the wheel 103. Thus with no nurse the occupant can release the brakes and move the chair.

Figure 12:
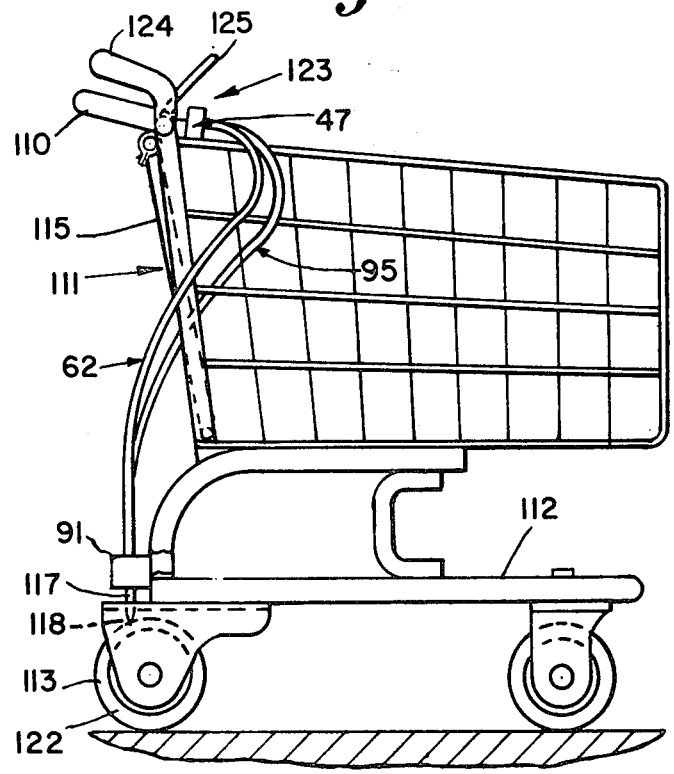
FIG. 12 is a side elevation.
Figure 13:
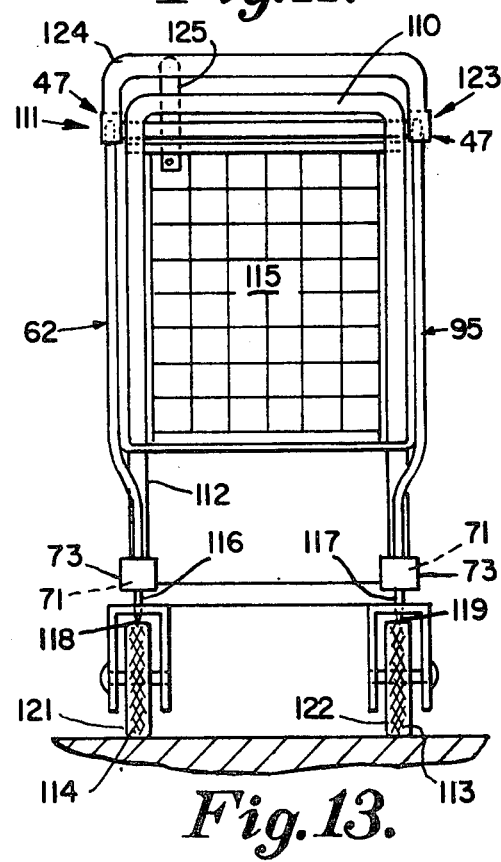
FIG. 13 is a front elevation of a shopping cart with the automatic safety device of the invention plus a nesting gate operated release for the cart boy.

As shown in FIGS. 12 and 13 the invention adapts itself to a shopping cart 111, of the type having a frame 112, wheels 113 and 114, a push handle 110 and a pivoted nesting gate 115. When there are no spoked wheels, the wheel obstructing portion of the brake rods 116 and 117 includes a sharp terminal end 118 or 119 which pierces into the rubber of the tires 121 or 122. The brake rod brackets 73, brake rods, 116, 117 finger grip brackets 47, control cables 62, 95, etc. are all otherwise similar to those shown in FIGS. 1–11.

As in the case of the wheel chair 101, since no infant is involved, it is desirable to have an additional brake release 123 whereby a cart boy may nest a number of carts without having to press the finger grip handle 124. A lever arm 125 extends upwardly from gate 115, on one side thereof, so that when the gate is pivoted upwardly by the insertion of another cart, the arm 125 will depress the finger grip handle 124, which controls the brakes, and release the brake rods to permit the set of nested carts to be advanced.

I claim:

1. In combination
a collapsible, foldable, baby stroller having a skeletonized foldable frame, a front and rear axle, spoked front and rear wheels and a push bar handle;
and automatic brake means comprising:
a pair of finger bar brackets each clamped proximate one of the opposite ends of said push bar handle, each having a fixed portion and a pivotable portion, said pivotable portions supporting a hollow tubular telescopable finger bar therebetween;
a pair of brake rod brackets, each clamped on an opposite side of said frame, proximate said front wheels, each having a brake rod slidable therein and normally spring biased outwardly with the free tip thereof between the spokes of one of said front wheels and each brake rod having a set screw slide mounted thereon;
and a sheathed flexible stranded cable connecting each finger bar bracket to one of said brake rod brackets, each stranded cable connecting the pivotable portion of a finger bar bracket to the set screw slide of a brake rod and one end of each sheath of each said cable being affixed to the fixed portion of a finger bar bracket and the other end of each said sheath being affixed to the corresponding brake rod bracket.

2. A combination as specified in claim 1 wherein:
each said brake rod is slidable in a bracket of U shape and said bracket includes a pair of opposite integral ears for worm drive clamping on said frame.

3. A combination as specified in claim 2 wherein:
each said set screw slide on each said brake rod is juxtaposed to a coil spring encircling said rod, the slidable position of said set screw slide adjusting the compression of said spring to provide a soft touch to said finger bar.

4. A combination as specified in claim 1 wherein:
the pivotable portions of said finger bar brackets, and the hollow tubular telescopable finger bar portion therebetween are of generally square cross section to transmit pressure from one end to the other without tendency to twist.

5. A combination as specified in claim 1 wherein:
said hollow tubular, telescopable finger bar is normally spaced at least 2½ inches from said push bar handle to constitute a greater spread than the grasp of the fingers of the hand of a small child.

6. A combination as specified in claim 1 wherein:
each end of each sheath is affixed to a finger bar bracket or to a brake rod by copper tubing compression fittings.

* * * * *